United States Patent [19]

DeMarco

[11] Patent Number: 5,079,304

[45] Date of Patent: Jan. 7, 1992

[54] POLYACRYLATE WITH SUBSTITUTED UREA OR THIOUREA RETARDER AND AMMONIUM OR PHOSPHONUM COMPOUNDS

[75] Inventor: Robert D. DeMarco, Avon Lake, Ohio

[73] Assignee: Zeon Chemicals U.S.A., Inc., Louisville, Ky.

[21] Appl. No.: 451,684

[22] Filed: Dec. 18, 1989

Related U.S. Application Data

[63] Continuation of Ser. No. 254,517, Oct. 6, 1988, abandoned.

[51] Int. Cl.$^5$ .......................... C08F 8/00; C08F 220/18
[52] U.S. Cl. ........................ 525/329.8; 525/328.2; 525/328.5; 525/328.9; 525/329.2; 525/329.5; 525/329.7; 525/330.4; 525/340; 525/374
[58] Field of Search .............. 525/328.2, 328.5, 328.9, 525/329.2, 329.5, 329.7, 329.8, 329.9, 330.3, 330.4

[56] References Cited

U.S. PATENT DOCUMENTS

| | | | |
|---|---|---|---|
| 3,875,092 | 4/1975 | Morris | 525/330.5 |
| 3,976,610 | 8/1976 | Morris | 525/330.5 |
| 4,042,642 | 8/1977 | Lawrence | 525/351 |

*Primary Examiner*—Christopher Henderson
*Attorney, Agent, or Firm*—Daniel J. Hudak Co.

[57] ABSTRACT

A dual cure site polyacrylate polymer is provided which utilizes an aliphatic or aryl substituted urea or thiourea as a retarder to inhibit scorch during processing. While the polymer utilizes a retarder, compression set characteristics are not harmed and in fact may be enhanced by the use of the retarder.

10 Claims, No Drawings

POLYACRYLATE WITH SUBSTITUTED UREA OR THIOUREA RETARDER AND AMMONIUM OR PHOSPHONUM COMPOUNDS

This application is a continuation of application Ser. No. 07/254,517 filed Oct. 6, 1988, now abandoned, of Robert D. DeMarco, for "Polyacrylate Polymers Utilizing Substituted Urea Retarder".

FIELD OF THE INVENTION

The present invention relates to a polyacrylate rubber having halogen and carboxyl cure sites and utilizing an aliphatic or aryl substituted urea or thiourea as a retarder to inhibit scorch during processing. Additionally, the retarder is at least neutral with regard to the compression set characteristics of the rubber, and in fact it may even act to enhance the compression set. A process of curing the polyacrylate rubber is also presented.

BACKGROUND ART

U.S. Pat. No. 3,875,092 to Morris relates to acrylate rubbers having both halogen and carboxyl cure sites and utilizing a quaternary ammonium salt curative.

The use of acid retarders with polyacrylates in general has been known. Examples of such retarders include for example, citric acid, acetic acid, stearic acid., and the like. However, these acids also slow the cure at elevated temperatures and yield higher compression set values.

In a sales brochure entitled "Zeonet A/Zeonet B, A Non-Postcure Vulcanizing Agents for Acrylic Elastomers Nipol AR," the Nippon Zeon Co. LTD discloses that diphenyl urea may be used as a retarder for epoxy cure site acrylates.

However, it has been heretofore unknown to use urea or thiourea type compounds in halogen carboxyl cure site polyacrylate rubbers. Moreover, it has not been known to improve compression set characteristics in a polyacrylate system by the use of a retarder.

The present invention presents a heretofore unknown retarder for use with dual site polyacrylate rubbers as described in this patent. A retarder is an agent which is used to inhibit the onset and rate of vulcanization in order to decrease the tendency of a polymer to "scorch." Scorch is defined as an increase in the viscosity to the point where the material will no longer flow into the desired shape. Scorch occurs as a result of premature crosslinking.

Acrylate rubbers exhibit favorable qualities of weatherability, high temperature serviceability and good oil resistance. Thus the acrylate rubbers in accordance with the invention are useful for automotive and non-automotive applications, such as industrial and out-of-door applications. These acrylates may be used in processing such as compression, injection, or transfer moldings; steam autoclaves; continuous vulcanization (CV); cure techniques; and the like.

SUMMARY OF THE INVENTION

The invention relates to an aliphatic or aromatic substituted urea or thiourea having the general formula

(FORMULA I)

wherein X is sulfur or oxygen and $R^1$ and $R^2$ independently are aliphatic or aromatic or combinations thereof having 1 to 30 carbon atoms or hydrogen. The retarders of the invention are used with polyacrylates having dual cure sites and using a curative which incorporates a metallic acid salt and a quaternary salt of ammonium and/or phosphonium. The retarder is at least neutral to the characteristics of compression set and in the preferred embodiment causes an enhancement of compression set.

DETAILED DESCRIPTION

Acrylate rubbers of the present invention have improved processing characteristics as a result of the addition of a urea or thiourea of the general Formula I

(FORMULA I)

wherein X is sulfur or oxygen and preferably oxygen; and $R^1$ and $R^2$ independently are aliphatic or aromatic, or combinations thereof, having 1 to 30 carbon atoms or hydrogen; and preferably $R^1$ and $R^2$, independently, are aliphatic or aromatic having from 1 to 18 carbon atoms or hydrogen; and most preferably $R^1$ and $R^2$, independently, are aliphatic or aromatic having 1 to 12 carbon atoms wherein one or both are aryl having 6 to 12 carbon atoms. Examples of suitable retarders include urea, diphenyl urea, 1,3-diethyl thiourea, 1,3-dibutyl thiourea, trimethyl thiourea, and ethylene thiourea, with preferred retarders being diphenyl thiourea and diphenylurea. The retarder is added at a level of 0.5 to 7, and preferably 1 to 4; and most preferably 2 to 3 parts by weight per 100 parts polymer. The retarder of the present invention can be used in combination with conventional acidic retarders as are known in the art. Examples of such retarders include stearic acid, citric acid, acetic acid, and the like. When an acid retarder is used, the amount of the present retarder is reduced accordingly so that the total parts remain within the ranges cited above. It is preferable that the total retarder is at least 25 percent by weight of the retarder of the present invention, and most preferably 50 percent by weight based on the total weight of the retarders used. The retarder of the present invention results in a delay in the onset of vulcanization as compared to a comparable polyacrylate system without the retarder. This effect is shown by the Mooney Viscometer Large Rotor Test, ASTM D1646 at 100° C. where t5 has an improvement of 25 percent, preferably 50 percent, as compared to a comparable sample without the retarder. An improvement corresponds to an increase in t5 time. This effect is further shown by a Rheometer oscillating disc test at 190° C. with 3° arc at 100 cpm having an improvement of at least 25 percent, and preferably at least 50 percent. An improvement in Rheometer reading corresponds to an increase in the ts2 scorch time.

It is a further aspect of the invention that the retarder is at least neutral to the characteristics of compression set. By neutral to compression set it is meant that the addition of the retarder to the polymeric system, i.e., the polymer and curative, does not raise the compression set value to an unacceptable level. By this it is meant that the compression set value of the sample with the retarder is below 50 percent. Thus, the compression set value measured according to ASTM Test D-395 Method B at 70 hours at 150° C., plied, %, of the polymer using the retarder of the present invention is effectively the same for the given applications as the identical composition without the retarder. By "identical composition without the retarder," it is meant that the same recipe and specifictaions are used to mix the two compositions except that the retarder is left out of one composition. Thus, the system with the retarder will have a compression set of equal to or less than 50 percent, and preferably equal to or less than 40 percent. It is further envisioned in the preferred embodiment that the retarder may enhance the compression set to cause an improvement of 5 percent, and preferably 10 percent of the comparable system without a retarder. This enhancement can result from the inclusion of one or more aromatic groups in the retarder, such as are present in diphenyl urea or diphenyl thiourea The acrylate rubber contains from about 40 percent to about 99.8 percent by weight, based upon the weight of the polymer, of an acrylate of the formula:

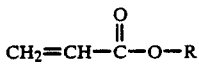

wherein R is an alkyl radical containing 1 to 8 carbon atoms, an alkoxyalkyl or alkylthioalkyl radical containing 2 to about 12 carbon atoms. The alkyl structure can contain primary, secondary, or tertiary carbon configurations. Examples of such acrylates are methyl acrylate, ethyl acrylate, propyl acrylate, n-butyl acrylate, isobutyl acrylate, n-pentyl acrylate, isoamyl acrylate, n-hexyl acrylate, 2-methyl-pentyl acrylate, n-octyl acrylate, 2-ethylhexyl acrylate, n-decyl acrylate, n-dodecyl acrylate, n-octadecyl acrylate, and the like; methoxymethyl acrylate, methoxyethyl acrylate, ethoxyethyl acrylate, butoxyethyl acrylate, ethoxypropyl acrylate, methylthioethyl acrylate, hexylthioethyl acrylate, and the like; and $\alpha,\beta$-cyanoethyl acrylate, $\alpha$, $\beta$- and $\gamma$- cyanopropyl acrylate, cyanobutyl acrylate, cyanohexyl acrylate, cyanooctyl acrylate, and the like. Often mixtures of two or more monomers and/or types of acrylate monomers can be employed.

Preferably, the rubber contains from about 65 percent to about 99.6 percent by weight of acrylates of the formula set forth previously, wherein R is an alkyl radical containing 1 to about 10 carbon atoms or an alkoxyalkyl radical containing 2 to about 8 carbon atoms. Examples of the more preferred acrylates are ethyl acrylate, propyl acrylate, n-butyl acrylate, hexyl acrylate, 2-ethylhexyl acrylate, octyl acrylate, and the like, and methoxyethyl acrylate, ethoxyethyl acrylate, and the like. Both an alkyl acrylate and an alkoxyalkyl acrylate can be used.

The rubber contains from about 0.1 percent to about 30 percent by weight of an active halogen-containing monomer. The halogen groups can be chlorine, bromine, or iodine. Examples of such monomers are vinyl chloroacetate, vinyl bromoacetate, allyl chloroacetate, vinyl chloropropionate, vinyl chlorobutyrate, vinyl bromobutyrate, 2-chloroethyl acrylate, 3-chloropropyl acrylate, 4-chlorobutyl acrylate, 2-chloroethyl methacrylate, 2-bromoethyl acrylate, 2-iodoethyl acrylate, 2-chloroethyl vinyl ether, chloromethyl vinyl ketone, 4-chloro-2-butenyl acrylate, vinyl benzyl chloride, 5-chloromethyl-2-norbornene, 5-($\alpha$-chloroacetoxymethyl)-2-norbornene, 5-($\alpha,\beta$-dichloropropionylmethyl)-2-norbornene, and the like. The preferred monomers are vinyl chloroacetate, allyl chloroacetate, 2-chloroethyl acrylate, 2-chloroethyl vinyl ether, vinyl benzyl chloride, 5-chloromethyl-2-norbornene, and 5-chloroacetoxymethyl-2-norbornene.

More preferably, the rubber contains from about 0.2 percent to about 15 percent by weight of the active halogen-containing monomer. At this level, the halogen content is from about 0.1 percent to about 5 percent by weight of the rubber.

The rubbers also contain from about 0.1 percent to about 20 percent by weight of a carboxyl-containing monomer. The monomer can be monocarboxylic or polycarboxylic, containing from 3 to about 8 carbon atoms. Examples of such monomers are acrylic acid, methacrylic acid, ethacrylic acid, $\beta,\beta$-dimethylacrylic acid, crotonic acid, 2-pentenoic acid, 2-hexenoic acid, maleic acid, furmaric acid, citraconic acid, mesaconic acid, itaconic acid, 3-butene-1,2,3-tricarboxylic acid, and the like.

More preferably the rubber contains from 0.2 percent to about 10 percent by weight of the carboxyl containing monomer. At this level, the carboxyl content is from about 0.1 percent to about 7 percent by weight of the rubber. The more preferred monomers are the monocarboxylic acid monomers such as acrylic acid, methacrylic acid, itaconic acid, and the like.

The rubber can contain up to about 35 percent and preferably up to about 10 percent by weight of other copolymerizable vinylidene monomers having a terminal vinylidene ($CH_2=C<$) group. Examples of such are phenyl acrylate, cyclohexyl acrylate, methacrylates such as methyl methacrylate, ethyl methacrylate, and the like; vinyl and allyl esters such as vinyl acetate, vinyl propionate, allyl acetate, and the like; vinyl ketones such as methyl vinyl ketone; vinyl and allyl ethers such as vinyl methyl ether, vinyl ethyl ether, allyl methyl ether, and the like; vinyl aromatics such as styrene,$\alpha$-methyl styrene, vinyl toluene, and the like; vinyl nitriles such as acrylonitrile and methacrylonitrile; vinylamides such as acrylamide, methacrylamide, N-methyl such as butadiene, isoprene, divinyl benzene, divinyl ether, diethylene glycol diacrylate, and the like. The more preferred copolymerizable monomers are vinyl acetate, methyl methacrylate, ethyl methacrylate, styrene, acrylonitrile, acrylamide, divinyl benzene, and diethylene glycol diacrylate.

The acrylate rubbers can be prepared using emulsion (latex), suspension, solution and bulk techniques known to those skilled in the art. Because it is desirable to polymerize the monomers to 90 percent conversion or over, emulsion and suspension techniques are usually employed. The polymerization can be performed as a batch reaction or one or more ingredients can be proportioned during the manufacturing process. Temperature of polymerization ranges from about $-10°$ C. to about 100° C., whereas a more preferred range is from about 5° C. to about 80° C.

The polymerization can be initiated by free-radical generating agents. Examples of such agents are organic peroxides and hydroperoxides such as benzoyl peroxide, dicumyl peroxide, cumene hydroperoxide, parathane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like.

Typical emulsion polymerization ingredients would include a persulfate salt or organic peroxide and usually a redox system, water adjusted to the desired pH with acids or basis and usually buffered with inorganic salts, and either anionic, cationic, or nonionic surface active agents well known in the art.

The polymerization normally is continued until about 90 percent conversion of the monomers is obtained. The resulting latex (if the emulsion process is employed) can be coagulated to isolate the polymer. Typical coagulation procedures are salt-acid coagulations, use of polyvalent metal salts such as magnesium sulfate ($MgSO_4$) or calcium chloride, use of alcohols such as methanol, isopropyl alcohol, and freeze agglomeration techniques. The rubber is then usually washed with water and dried.

The acrylate rubbers have raw polymer Mooney values (ML-4 at 212° F.) from about 20 to about 100.

The rubbers are admixed with cure ingredients and compounding ingredients using conventional equipment such as a Banbury mixer, extruders, and the like.

When preparing a vulcanizable composition, the polymer is mixed with the curing agents in a Banbury mixer, or other conventional equipment. The vulcanizable composition, in addition to the curing system and the polymers, may also include conventional carbon blacks, other fillers, antioxidants, emulsifiers, plasticizers, retarders, accelerators, and the like conventionally known in the art.

The polyacrylate system may be cured using a two-part or a one-part curative system. The two-part system utilized in the present invention can consist of a metallic acid salt and an alkyl substituted ammonium and/or phosphonium quaternary salt. The metallic acid salt can be an alkali metal salt of a carboxylic acid containing from 2 to about 24 carbon atoms and organophosphoric acids of the formula $$(R-O_zPO_y)M$$

where M is an alkali metal, y equals 1 or 2, z equals 1 or 2, and y plus z equals 3, and R is selected from the group consisting of alkyl radicals containing from 1 to about 24 carbon atoms, and an aryl radical containing from 6 to about 24 carbon atoms. Specific examples of suitable metallic acid salts include carboxylic acid salts such as stearic, acetic, butyric, lauric, palmetic, oleic, benzoic acids; and organophosphoric acid salts such as alkylphenoxy poly(ethyleneoxy) ethyl phosphate. More specific acid salts include sodium stearate, potassium stearate, copper stearate, or the like.

The substituted ammonium and/or phosphonium quaternary salts are salts in which all four hydrogen atoms of ammonium or phosphonium have been replaced with organic radicals. The quaternary ammonium or phosphonium salts have the structure $$\left[\begin{array}{c} R_1 \diagdown \diagup R_3 \\ (Q) \\ R_2 \diagup \diagdown R_4 \end{array}\right]^+ X^-$$

wherein Q is nitrogen or phosphorous, wherein $R_1$, $R_2$, $R_3$ and $R_4$ are hydrocarbon radicals containing 1 to about 18 carbon atoms such as alkyl, aryl, alkaryl, aralkyl radicals, or wherein two or three of the $R_1$, $R_2$, $R_3$ and $R_4$ form with the nitrogen or phosphorous atom a heterocyclic structure containing 3 to 8 atoms selected from the group consisting of carbon, nitrogen, oxygen and sulfur wherein at least two atoms are carbon; and X is an anion of an organic or inorganic acid wherein the acidic hydrogen is attached to a halogen or an oxygen atom, and in particular wherein X is a halogen or alkyl, alkaryl or alkoxy acid of the group carboxylic, phosphoric and sulfuric acid. More specific examples of such anions include chlorine ($Cl^-$), bromine ($Br^-$), iodine ($I^-$), or hydroxide ($OH^-$), sulfuric acid ($HSO_4$), phosphoric acid ($H_2PO_4$), carboxylic acid ($RCOO-$), organosulfuric acid ($ROSO_3$ or $RSO_3$), and organo-phosphoric acid ($ROPO_3H$) where in the last examples R is an alkyl or alkaryl radical containing from 1 to about 18 carbon atoms.

In the one-part cure system of the present invention, the metallic acid salt is not employed and the ammonium or phosphonium quaternary salt must be a carboxylic or organophosphoric acid salt. Specifically the curative is an ammonium or phosphonium quaternary acid salt wherein the acid is either a carboxylic acid containing from 2 to about 24 carbon atoms or an organophosphoric acid of the formula $$(R-O)_zPO_yM$$

where M is the ammonium or phosphorium quaternary salt, y equals 1 or 2, z equals 1 or 2, and y plus z equals 3, and R is selected from the group consisting of alkyl radicals containing from 1 to about 24 carbon atoms, and an aryl radical containing from 6 to about 24 carbon atoms. Preferably, in the one-part cure system, X is a stearate ion of the formula $RCOO-$, and more preferably $C_{17}H_{35}COO-$. The preferred quaternary ammonium or phosphonium stearate salt has the following formula:

$$\left[\begin{array}{c} R_1 \diagdown \diagup R_3 \\ (Q) \\ R_2 \diagup \diagdown R_4 \end{array}\right]^+ RCOO^-$$

wherein Q is nitrogen or phosphorous, and wherein $R_1$, $R_2$, $R_3$, and $R_4$ are the same as previously stated.

Examples of quaternary ammonium salts for the two-part cure system are tetramethyl ammonium chloride, tetramethyl ammonium bromide, trimethylethyl ammonium iodide, trimethylsoya ammonium chloride, trimethylcetyl ammonium bromide, trimethylbenzyl ammonium chloride, dimethylethylcetyl ammonium chloride, dimethyloctylbenzyl ammonium chloride, dimethyloleyl benzyl ammonium chloride, dimethyloctadecylbenzyl ammonium chloride, dimethylphenylbenzyl ammonium bromide, dimethyldibenzyl ammonium bromide, methylethylpropylisobutyl ammonium chloride, (tetradecyl)trimethyl ammonium chloride, methylcetyldibenzyl ammonium bromide, cetylpyridinium chloride, dodecylpyridinium bromide, tetrabutyl ammonium chloride, tetrabutyl ammonium bromide, tetrabutyl ammonium iodide, tetramethyl ammonium hydroxide pentahydrate, cetyldimethylethyl ammonium bromide, cetyltrimethyl ammonium-p-toluenesulfonate, myristyltrimethyl ammonium bromide, and the like.

Examples of quaternary phosphonium salts for the two-part cure system are tetraphenyl phosphonium bromide, hexadecyltributyl phosphonium bromide, tetraphenyl phosphonium chloride, tetraphenyl phosphonium iodide, tetrabutyl phosphonium chloride, tetrabutyl phosphonium bromide, triphenylbenzyl phosphonium chloride, triphenylbenzyl phosphonium bromide, triphenylbenzyl phosphonium iodide, triphenylmethoxymethyl phosphonium chloride, triethylbenzyl phosphonium chloride, tricyclohexylbenzyl phosphonium chloride, and the like.

Examples of quaternary ammonium or phosphonium acid salts employed as the one-part curative are trimethylbenzyl ammonium stearate, trimethylbenzyl phosphonium stearate, trimethylsoya ammonium stearate, trimethylsoya phosphonium stearate, tetramethyl ammonium stearate, tetramethyl phosphonium stearate, cetyltrimethyl ammonium stearate, cetyltrimethyl phosphonium stearate, tetrabutyl ammonium stearate, dimethylphenylbenzyl ammonium stearate, dimethylphenylbenzyl phosphonium stearate, alkylphenoxypoly(ethyleneoxy)ethyl phosphate, and the like.

These quaternary ammonium or phosphonium salts may be used singly or as a mixture of two or more. The amount of the quaternary ammonium or phosphonium salt is usually 0.1 to 20 parts by weight per 100 parts by weight of the polymer, and preferably 1 to 4 parts. The metallic acid salt employed in the two-part cure system is in the range of 0.1 to 10 parts by weight per 100 parts by weight of the polymer, and preferably 2-6 parts.

EXAMPLE 1

This example demonstrates the higher Mooney Viscometer values of the compositions utilizing the retarder of the present invention. The following ingredients were uniformly mixed in a Banbury mixer at room temperature (25° C.).

TABLE I

| Ingredients | Parts by Wt. Based Upon 100 phr. | Description |
|---|---|---|
| Polyacrylate rubber | 100 | Polyacrylate with dual cure site chloride/carboxyl |
| Stearic Acid | 1 | Retarder, lubricant |
| Struktol WB-222 | 2 | Ester of saturated fatty acid, process aid |
| N 550, FEF | 65 | Carbon black filler |
| Agerite* Stalite S | 2 | Octylated diphenyl amine, antioxidant |
| Total | 170 parts by weight | |

To 170 parts of the master batch, 5 parts of curative were added, namely: sodium stearate 4 parts by weight, and 1 part of cetyltrimethyl ammonium bromide, for a total vulcanizable composition of 175 parts by weight. The sample is identified as Sample 1. A second sample was mixed, Sample 2, using the identical recipe except the sample also included one part of diphenyl urea retarder. Once the compositions were uniformly mixed by a two roll mill or a Banbury mixer, the Mooney viscosities were determined using a large rotor at 100° C. and 125° C. The results are set forth below and indicate that the retarder effectively delays the onset of vulcanization and further that this retarder reduces compression set.

TABLE II

| Sample | 1 | 2 |
|---|---|---|
| MOONEY VISCOMETER: Large Rotor, 100° C. | | |
| Visc. Minimum | 56 | 53 |

TABLE II-continued

| Sample | 1 | 2 |
|---|---|---|
| T5, minutes | 9.5 | 18 |
| T35, minutes | 16.5 | >30 |
| MOONEY VISCOMETER: Large Rotor, 125° C. | | |
| Visc. Minimum | 46 | 41 |
| T5, minutes | 3.0 | 3.5 |
| T35, minutes | 4.0 | 5.5 |
| RHEOMETER, MICRODIE; 100 cpm, 3° ARC 190° C. | | |
| ML, lbf in | 9.4 | 8.2 |
| MH, lbf in | 61.7 | 54.7 |
| Ts2, minutes | 0.5 | 0.7 |
| T'90, minutes | 3.5 | 3.8 |

TABLE III

| Vulcanized Properties | | |
|---|---|---|
| Sample | 1 | 2 |
| ORIGINALS Cure Temp. 190° C. | | |
| Cure Time, min. | 4 | 4 |
| Stress 100%, psi | 707 | 614 |
| Tensile, psi | 1612 | 1677 |
| Elongation, % | 222 | 259 |
| Hardness, A points ("pts.") | 76 | 65 |
| COMPRESSION SET, METHOD B | | |
| Plied | | |
| 70 h @ 150° C., % SET | 27.5 | 17.6 |
| COMPRESSION SET, METHOD B | | |
| Cure Time, min. | 6 | 6 |
| Buttons | 23.9 | 17.1 |
| 70 h @ 150° C., % SET | | |
| AGING: ENVIRONMENT 70 hrs. @ 204° C. | | |
| Tensile, psi | 1235 | 1109 |
| Tensile, Change % | −23 | −34 |
| Elongation, % | 196 | 239 |
| Elongation, Change % | −12 | −8 |
| Hardness, A pts. | 76 | 73 |
| Hard Change, pts. | 0 | 8 |
| 180° Bend | pass | pass |

EXAMPLE 2

The following samples illustrate the effect of the retarder at varying levels. The samples were mixed in a Banbury mixer using a masterbatch in the same manner as the sample of Example 1. The curative, sodium stearate, and retarder were added and the compositions were mixed on a Banbury mixer. The recipes are set forth in Table IV below and the test results are set forth in Tables V through VII.

TABLE IV

| | Recipes | | | | | |
|---|---|---|---|---|---|---|
| | 1 | 2 | 3 | 4 | 5 | 6 |
| Polyacrylate Rubber | 100.00 | 100.00 | 100.00 | 100.00 | 100.00 | 100.00 |
| Stearic Acid | 1.00 | 1.00 | 1.00 | 1.00 | 3.00 | 1.00 |
| Struktol WB-222 | 2.00 | 2.00 | 2.00 | 2.00 | 2.00 | 2.00 |
| N550, FEF | 65.00 | 65.00 | 65.00 | 65.00 | 65.00 | 65.00 |
| Agerite Stalite S | 2.00 | 2.00 | 2.00 | 2.00 | 2.00 | 2.00 |
| Sodium Stearate | 4.00 | 4.00 | 4.00 | 4.00 | 4.00 | 6.00 |
| Cetyltrimethyl Ammonium Bromide | 1.00 | 1.00 | 1.00 | 1.00 | 1.00 | 1.5 |
| Diphenyl Urea | 0.00 | 1.00 | 3.00 | 5.00 | 3.00 | 3.00 |
| TOTAL: | 175.00 | 176.00 | 178.00 | 180.00 | 180.00 | 181.50 |

TABLE V

| PROCESSING PROPERTIES | 1 | 2 | 3 | 4 | 5 | 6 |
|---|---|---|---|---|---|---|
| MOONEY VISCOMETER: Large Rotor, 100° C. Original/2 Week Shelf Aged at 23° C. | | | | | | |
| Visc. Minimum | 44/41 | 44/41 | 47/42 | 45/40 | 37/32 | 44/40 |
| T5, minutes | 10/10.5 | 15/16.2 | 22/21/8 | 22/>30 | >30/>30 | 15/15.5 |
| T35, minutes | 16/18.5 | 30/31 | >30/>30 | >30/>30 | >>30/>>30 | 28/27.5 |
| MOONEY VISCOMETER: Large Rotor, 125° C. | | | | | | |
| Visc. Minimum | 35 | 34 | 35 | 32 | 28 | 36 |
| T5, minutes | 3.0 | 4.0 | 4.8 | 6.0 | 4.2 | 4.0 |
| T35, minutes | 4.2 | 5.7 | 1.2 | 9.2 | 13.2 | 6.0 |
| RHEOMETER, MICRODIE, 100 cpm, 3° ARC 190° C. | | | | | | |
| ML, lbf in | 6.3 | 6.3 | 6.3 | 4.5 | 4.5 | 6.7 |
| MH, lbf in | 58.6 | 53.2 | 48.6 | 35.1 | 33.3 | 45.9 |
| Ts2, minutes | 0.5 | 0.7 | 0.8 | 0.9 | 1.0 | 0.7 |
| T'90, minutes | 5.3 | 4.7 | 4.8 | 5.1 | 5.3 | 3.4 |

TABLE VI

| | 1 | 2 | 3 | 4 | 5 | 6 |
|---|---|---|---|---|---|---|
| VULCANIZED PROPERTIES | | | | | | |
| ORIGINALS: Cure Time 4 min., Cure Temp., 190° C. | | | | | | |
| Stress 100%, MPa | 5.5 | 4.8 | 4.3 | 2.8 | 2.7 | 4.3 |
| Tensile, MPa | 11.9 | 12.3 | 11.9 | 10.9 | 10.4 | 11.5 |
| Elongation, % | 230 | 250 | 250 | 340 | 350 | 260 |
| Hardness, A pts. | 63 | 63 | 62 | 58 | 60 | 63 |
| ORIGINALS: Cure Time 4 min., Cure Temp., 190° C. Post Cure Time, 4 min., Cure Temp., 177° C. | | | | | | |
| Stress 100%, MPa | 5.3 | 5.2 | 5.0 | 3.5 | 3.2 | 3.8 |
| Tensile, MPa | 11.7 | 12.1 | 11.7 | 10.8 | 10.6 | 10.9 |
| Elongation, % | 220 | 230 | 240 | 300 | 310 | 270 |
| Hardness, A pts | 68 | 65 | 66 | 65 | 67 | 66 |
| COMPRESSION SET, METHOD B, Cure Time, 6 min., Cure Temp., 190° C. | | | | | | |
| Buttons 70 h @ 150° C., % Set | 27 | 18 | 17 | 29 | 28 | 16 |
| COMPRESSION SET, METHOD B, Cure Time, 6 min., Cure Temp., 190° C. Post Cure Time, 4 min., Cure Temp., 177° C. | | | | | | |
| Buttons 70 h @ 150° C., % Set | 13 | 11 | 12 | 15 | 18 | 13 |

TABLE VII

| AGED PROPERTIES AGING: ENVIRONMENT, Air Test Tube, 70 hrs., @ 204° C. | | | | | | |
|---|---|---|---|---|---|---|
| | 1 | 2 | 3 | 4 | 5 | 6 |
| Tensile Change, % | −43 | −44 | −42 | −47 | −55 | −35 |
| Elong. Change, % | −43 | −24 | −20 | −41 | −31 | −54 |
| Hard Change, pts. | 14 | 9 | 10 | 4 | 13 | 11 |
| 180° Bend | Pass | Pass | Pass | Pass | Pass | Pass |

EXAMPLE 3

The following samples illustrate the use of a retarder at varying levels. Once again, the samples were mixed in a Banbury mixer using a masterbatch in the same manner and proportions as the samples of Example 1. The remaining ingredients were added and the compositions were mixed on a Banbury mixer.

TABLE VIII

| | Recipes | | | | |
|---|---|---|---|---|---|
| | 1 | 2 | 3 | 4 | 5 |
| Polyacrylate Rubber | 100.00 | 100.00 | 100.00 | 100.00 | 100.00 |
| Stearic Acid | 1.00 | 1.00 | 1.00 | 1.00 | 1.00 |
| Struktol WB-222 | 2.00 | 2.00 | 2.00 | 2.00 | 2.00 |
| N550, FEF | 65.00 | 65.00 | 65.00 | 65.00 | 65.00 |
| Agerite Stalite S | 2.00 | 2.00 | 2.00 | 2.00 | 2.00 |
| Sodium Stearate | 4.00 | 4.00 | 4.00 | 4.00 | 4.00 |
| Cetyltrimethyl Ammonium Bromide | 1.00 | 1.00 | 1.00 | 1.00 | 1.00 |
| *SynproR-55, 75% Urea | 0.00 | 1.00 | 3.00 | 5.00 | 7.00 |
| TOTAL: | 175.00 | 176.00 | 178.00 | 180.00 | 182.00 |

*75% urea in EPDM binder sold by Synthetic Products Company

TABLE IX

| Processing Properties | 1 | 2 | 3 | 4 | 5 |
|---|---|---|---|---|---|
| MOONEY VISCOMETER: Large Rotor, 100° C. | | | | | |
| Visc. Minimum | 57 | 55 | 53 | 53 | 51 |
| T5, minutes | 7.5 | 14 | 19 | 18 | 22 |
| T35, minutes | 12 | 27.5 | >30 | >30 | >30 |
| MOONEY VISCOMETER: Large Rotor, 125° C. | | | | | |
| Visc. Minimum | 47.0 | 43.0 | 42.0 | 43.0 | 39.0 |
| T5, minutes | 3.0 | 3.5 | 4.5 | 4.5 | 5.0 |
| T35, minutes | 4.0 | 5.0 | 6.0 | 7.0 | 8.5 |
| RHEOMETER, MICRODIE, 100 cpm, 3° ARC, 190° C. | | | | | |
| ML, lbf in | 9.5 | 8.7 | 7.9 | 7.8 | 6.9 |
| MH, lbf in | 63.3 | 54.3 | 40.4 | 36.3 | 33.9 |
| Ts2, minutes | 0.5 | 0.7 | 0.8 | 1.0 | 1.0 |
| T'90, minutes | 4.2 | 3.2 | 3.0 | 3.6 | 4.0 |

TABLE X

| VULCANIZED PROPERTIES | 1 | 2 | 2 | 4 | 5 |
|---|---|---|---|---|---|
| ORIGINALS: Cure Time, 4 min., Cure Temp., 190° C. | | | | | |
| Stress, 100%, psi | 870 | 933 | 735 | 691 | 590 |
| Tensile, psi | 1766 | 1848 | 1791 | 1709 | 1613 |
| Elongation, % | 209 | 213 | 243 | 253 | 274 |
| Hardness, A pts. | 68 | 68 | 68 | 68 | 67 |
| ORIGINALS: Cure Time, 4 min., Cure Temp. 190° C. Post Cure Time, 4 hr, P.C. Temp., 177° C. | | | | | |
| Stress, 100%, psi | 969 | 1031 | 1024 | 928 | 910 |
| Tensile, psi | 1754 | 1893 | 1911 | 1830 | 1816 |
| Elongation, % | 199 | 190 | 193 | 199 | 204 |
| Hardness, A pts. | 68 | 67 | 69 | 70 | 68 |
| Compression Set, Method B., Cure Time, 6 min., Cure Temp. 190° C. | | | | | |

TABLE X-continued

| VULCANIZED PROPERTIES | | | | | |
|---|---|---|---|---|---|
| | 1 | 2 | 2 | 4 | 5 |
| Buttons | 25.2 | 32.8 | 37.9 | 40.8 | 44.6 |

70 h
@ 150° C.,
% Set
Compression Set, Method B., Cure Time, 6 min.,
Cure Temp., 190° C.
Post Cure Time 4 hrs., P.C. Temp. 177° C.

| Buttons | 12.1 | 22.1 | 28.4 | 29.3 | 29.9 |
|---|---|---|---|---|---|

70 h
@ 150° C.,
% Set
Compression Set, Method B., Cure Time, 4 min.,
Cure Temp., 190° C.
Post Cure Time 4 hrs., P.C. Temp., 177° C.

| Plied | 13.5 | 21.3 | 32 | 34.1 | 35.2 |
|---|---|---|---|---|---|

70 h
@ 150° C.,
% Set

EXAMPLE 4

The following samples were mixed in a manner similar to Example 1 and illustrate the effect of various other retarders in accordance with the invention.

TABLE XI

| | Control | | | | | | |
|---|---|---|---|---|---|---|---|
| Recipe | 1 | 2 | 3 | 4 | 5 | 6 | 7 |
| Polyacrylate Rubber | 100 | 100 | 100 | 100 | 100 | 100 | 100 |
| Stearic Acid | 1 | 1 | 1 | 1 | 1 | 1 | 1 |
| Struktol WB-222 | 2 | 2 | 2 | 2 | 2 | 2 | 2 |
| Philblack N550 | 65 | 65 | 65 | 65 | 65 | 65 | 65 |
| Stalite S | 2 | 2 | 2 | 2 | 2 | 2 | 2 |
| Sodium Stearate | 4 | 4 | 4 | 4 | 4 | 4 | 4 |
| Cetyltrimethyl Ammonium Bromide | 1 | 1 | 1 | 1 | 1 | 1 | 1 |
| Diphenyl Thiourea | — | 1 | 2 | — | — | — | — |
| Ethylene Thiourea | — | — | — | 1 | — | — | — |
| Trimethyl Thiourea | — | — | — | — | 1 | — | — |
| 1,3-Diethyl Thiourea | — | — | — | — | — | 1 | — |
| 1,3-dibutyl Thiourea | — | — | — | — | — | — | 1 |
| | 175 | 176 | 177 | 176 | 176 | 176 | 176 |

TABLE XII

| | 1 | 2 | 3 | 4 | 5 | 6 | 7 |
|---|---|---|---|---|---|---|---|
| MOONEY VISCOMETER: Large Rotor, 100° C. | | | | | | | |
| Visc. Minimum | 47 | 48 | 47 | 47 | 49 | 48 | 49 |
| T5 minutes | 9.3 | 15 | 16.8 | 11 | 14 | 25.5 | 24.3 |
| T35 minutes | 15.8 | 31 | >31 | >31 | >31 | >31 | >31 |
| MOONEY VISCOMETER: Large Rotor, 125° C. | | | | | | | |
| Visc. Minimum | 37 | 39 | 38 | 41 | 40 | 39 | 40 |
| T5 minutes | 3 | 3 | 4 | 3.3 | 3.3 | 3.8 | 3.3 |
| T35 minutes | 4 | 5 | 6 | 4.8 | 4.5 | 6 | 4.8 |
| RHEOMETER, MICRODIE, 100 cpm, 3° Arc, 190° C. | | | | | | | |
| ML, lbf in | 7.4 | 7.9 | 7.8 | 7.9 | 7.9 | 7.5 | 7.8 |
| MHF, lbf in | 55.4 | 46.5 | 40.9 | 42.9 | 47.3 | 48.9 | 55.9 |
| Ts2 min. | 0.5 | 0.6 | 0.6 | 0.7 | 0.6 | 0.7 | 0.6 |
| T'90 min. | 3.2 | 3.0 | 3.2 | 4.4 | 4.0 | 4.0 | 3.8 |
| ORIGINAL PROPERTIES - Cured 4 min./190° C. | | | | | | | |
| Stress, 100% (psi) | 920 | 760 | 890 | 890 | 780 | 860 | 890 |
| Tensile (psi) | 1870 | 1910 | 1860 | 1800 | 1760 | 1790 | 1760 |
| Elongation (%) | 210 | 240 | 300 | 230 | 230 | 230 | 210 |
| Hardness, A pts. | 67 | 64 | 63 | 69 | 66 | 67 | 68 |
| Compression Set, Method B., Cure Time, 6 min., Cure Temp., 190° C. | | | | | | | |
| Buttons 70 h @ 150° C., % Set | 22 | 21 | 33 | 46 | 46 | 37 | 30 |
| Compression Set, Method B., Cure Time, 4 min., Cure Temp., 190° C. | | | | | | | |
| Plied 70 h @ 150° C., % Set | 29 | 28 | 38 | 51 | 40 | 37 | 33 |
| AIR TEST TUBE - 70 hrs. @ 204° C. | | | | | | | |
| Tensile (psi) | 220 | 850 | 630 | 1030 | 880 | 770 | 810 |
| Elongation (%) | 200 | 310 | 330 | 190 | 200 | 260 | 230 |
| Hardness, A pts. | 67 | 67 | 67 | 79 | 77 | 77 | 73 |
| 180° Bend | Pass | Pass | Pass | Pass | Pass | Pass | Pass |

While in accordance with the Patent Statutes, the best mode and preferred embodiment has been set forth, the scope of the invention is not limited thereto, but rather by the scope of the attached claims.

What is claimed is:

1. A composition comprising:
   (a) a polyacrylate rubber having halogen and carboxyl cure sites and comprising (i) from about 40 percent to about 99.8 percent by weight of an acrylate of the formula:

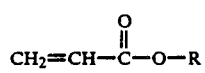

wherein R is selected from the group consisting of an alkyl radical containing 1 to 18 carbon atoms, an alkoxyalkyl, an alkylthioalkyl, and a cyanoalkyl radical containing 2 to 12 carbon atoms; (ii) from about 0.1 percent to about 30 percent by weight of a halogen-containing monomer selected from the group consisting of halogen-containing vinylene hydrocarbons and halogen-containing vinyl monomers having the halogen group at least two carbon atoms removed from an oxygen group; (iii) from about 0.1 percent to about 20 percent by weight of a carboxyl-containing monomer; and (iv) up to 35 percent by weight of a copolymerizable monomer containing a terminal vinylidene group;

(b) an effective amount of a curative which is an ammonium or phosphonium quaternary salt of a carboxylic or organophosphoric acid or an ammonium or phosphonium quaternary salt in combination with metallic acid salt, and (c) retarder comprising diphenyl urea or diphenylthio urea.

2. A composition according to claim 1, wherein said curative comprises from about 0.1 to about 25 parts by weight per 100 parts of the rubber of a metallic acid salt and a quaternary salt, said metallic acid salt being selected from the group consisting of carboxylic acids containing from 2 to about 24 carbon atoms and organophosphoric acids of the formula

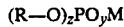

(R—O)$_z$PO$_y$M wherein M is an alkali metal, y equals 1 or 2, z equals 1 or 2, and y plus Z equals 3, and R is selected from the group consisting of alkyl radicals containing from 1 to about 24 carbon atoms, and aryl radicals containing from 6 to about 24 carbon atoms, and aryl radicals containing from 6 to about 24 carbon atoms and said quaternary salt being selected from the group consisting of an ammonium or phosponium quaternary salt of an anion Y where Y is an anion of an organic or inorganic acid wherein the acidic hydrogen is associated with a halogen or an oxygen atom.

3. A composition according to claim 2, wherein Y is selected from the group consisting of Cl—, Br—, I—, HSO$_4$, H$_2$PO$_4$—, RCOO—, ROSO$_3$, RSO$_3$—, and ROPO$_3$H— where R is an alkyl or alkaryl radical containing 1 to 18 carbon atoms.

4. A composition according to claim 3, wherein said ammonium or phosphonium quaternary stearate salts are selected from the class consisting of trimethyl benzyl ammonium stearate, trimethyl benzyl phosphonium stearate, trimethyl soyz ammonium stearate, trimethyl soya phosphonium stearate, tetramethyl ammonium stearate, tetramethyl phosphonium stearate, cetyl trimethyl ammonium stearate, cetyl trimethyl phosphonium stearate, dimethyl phenyl benzyl ammonium stearate, and dimethyl phenyl benzyl phosphonium stearate.

5. A composition according to claim 4, wherein said retarder comprises from about 0.5 to about 7 parts by weight per 100 parts rubber.

6. A composition according to claim 1, wherein the t5 value measured by the Mooney Viscometer Large Rotor Test, ASTM D1646, increases by 25 percent as compared to that value for the same test measured for an identical composition without said retarder.

7. A composition according to claim 1, wherein the t5 value measured by the Mooney Viscometer Large Rotor Test, ASTM D1646, increases by 50 percent as compared to that value for the same test measured for a identical composition without said retarder.

8. A composition according to claim 1, wherein the compression set value according to ASTM Test D395 at 70 hours at 150° C., plied percent, is effectively the same value as for the same test on an identical composition without said retarder.

9. A composition according to claim 1, wherein the compression set value according to ASTM Test D395 at 70 hours at 150° C., plied percent, is improved by 5 percent compared to the value for the same test on an identical composition without said retarder.

10. A composition according to claim 1, wherein the compression set value according to ASTM Test D395 at 70 hours at 150° C., plied percent, is improved by 10 percent compared to the value for the same test on an identical composition without said retarder.

* * * * *